United States Patent
Koch et al.

(12) 
(10) Patent No.: US 6,206,025 B1
(45) Date of Patent: Mar. 27, 2001

(54) DEVICE AND METHOD FOR REMOVING CONDENSATE FROM GAS PRESSURE SYSTEMS

(75) Inventors: Berthold Koch, Neuss; Rainer Wärzelberger, Erkrath, both of (DE)

(73) Assignee: BEKO Technologies GmbH (DE)

( * ) Notice: Subject to any disclaimer, the term of this patent is extended or adjusted under 35 U.S.C. 154(b) by 0 days.

(21) Appl. No.: 09/402,594
(22) PCT Filed: Jan. 7, 1998
(86) PCT No.: PCT/DE98/00020
  § 371 Date: Feb. 18, 2000
  § 102(e) Date: Feb. 18, 2000
(87) PCT Pub. No.: WO98/45641
  PCT Pub. Date: Oct. 15, 1998

(30) Foreign Application Priority Data
  Apr. 4, 1997 (DE) .............................. 197 14 037
(51) Int. Cl.⁷ ........................................ F16T 1/00
(52) U.S. Cl. .............................. 137/187; 137/392
(58) Field of Search ..................... 137/187, 392

(56) References Cited

U.S. PATENT DOCUMENTS

| | | | |
|---|---|---|---|
| 3,905,385 | 9/1975 | Green | 137/187 |
| 4,974,626 | * 12/1990 | Koch | 137/187 |
| 5,469,879 | 11/1995 | Rasmussen | 137/187 |
| 5,531,241 | 7/1996 | Rasmussen | 137/188 |

FOREIGN PATENT DOCUMENTS

| | | |
|---|---|---|
| 1.413.218 | 12/1965 | (FR) . |
| 2640354 | 6/1990 | (FR) . |

* cited by examiner

*Primary Examiner*—Gerald A. Michalsky
(74) *Attorney, Agent, or Firm*—Akerman Senterfitt

(57) ABSTRACT

The present invention relates to a device for removing condensate from gas pressure systems, especially dry-pipe systems having a condensate collector in which condensate accumulates when the gas pressure system is in operation, the collector being provided with an outlet. The collector also has a gauge containing a tubular body which is sized in relation to the outlet and designed to be secured thereto and which, when mounted, is located inside the collector and includes an electronic sensor, preferably a capacitive sensor, which is supported by the tubular body and of which at least one element, i.e., a preamplifier, is located therein and borne thereby, and is capable of functioning as a control for an external valve system.

24 Claims, 5 Drawing Sheets

DEVICE AND METHOD FOR REMOVING CONDENSATE FROM GAS PRESSURE SYSTEMS

This application is the national stage of International Patent Application No. PCT/DE98/000020, filed Jan. 7, 1998, which claims priority of German Patent Application No. 197 14 037.8, filed Apr. 4, 1997.

The invention relates to a method and to a device for letting off condensate from pressure gas systems, particularly from compressed air systems, that are provided with a receptacle for condensate in which the condensate is accumulating during operation of the pressure gas system and which has at least one outlet.

Many different devices of this type are known, like for example out of EP 391 250. According to this device, condensate accumulating in a receptacle of the already known device for letting off condensate is taken out of the pressure gas system at an outlet, for example at the deepest point of a conduit. At least one electronic sensor is projecting into this receptacle where it gauges the level of the condensate. Two such sensors are preferably provided at different heights. When the receptacle is filled up to the height of the upper sensor, a letting off procedure is starting to take place. The electronic connected with the sensors opens a valve arrangement. This clears the way for the condensate so that it may flow out of the receptacle into a condensate outflow. As soon as the condensate level reaches the height of the lower sensor, the electric triggered valve is closed again.

The valve arrangement has for example a control valve designed as a solenoid valve that controls a main valve being designed as a diaphragm valve. Thus, the operating forces and with them the demands upon the electronic are reduced.

The document FR 2 640 354 discloses a device for letting off condensate that uses only one sensor gauging a maximal level instead of two sensors gauging the level in a condensate receptacle. When this maximal level is reached, an outflow valve is opened for a predetermined period of time, so that condensate may stream out of the receptacle. Once the predetermined period of time is over, the outflow valve is closed again, condensate accumulating again in the receptacle.

The document FR 1 413 218 discloses a device for letting off condensate that has no receptacle for condensate of its own, the condensate being led into a receptacle of a pressure gas system via an opening located quite deep. By means of an electro sensor, the condensate level is gauged and a valve is triggered by means of which condensate may be let off the receptacle via an opening lying quite deep in said receptacle.

The disadvantage of the known devices for letting off condensate is, among others, the separate receptacle. Pressure gas systems usually are having receptacles of their own or may easily be retrofitted with such receptacles. Such receptacles are often big, often much bigger than the receptacles of devices for letting off condensate.

The use of two sensors for the determination of a maximal and a minimal level of condensate in a receptacle in which the device for letting off condensate is inserted, is difficult to build and often requires several accesses to the receptacle, so that the sensors may be arranged on it.

The use of only one sensor for the determination of a maximal level of condensate in a receptacle into which the device for letting off condensate is inserted combined with a predetermined period of time for letting off the condensate involves the problem that such a sensor has to be positioned in the upper part of the receptacle, which requires in most cases a separate access to the receptacle. Therefore, such a sensor can actually not be integrated into the device for letting off condensate.

Additionally, with the devices for letting off condensate with electronic level gaugers working in a capacitive way as they have been disclosed up to now, problems occurred due to dirt accumulation in the sensors, said problems being occasioned by the formation of an electrically conductive film between the electrodes of a capacitive sensor.

That is where the invention is coming to bear. Its object is to simplify and to design devices for letting off condensate of the type mentioned above so that they are less expensive. To this purpose, they have no receptacle of their own, but they are using the receptacle of a pressure gas system and they may be placed onto the container of this receptacle so that the overall function of a device for letting off condensate as it is known from the state of the art may be achieved, capacitive sensors being used as level gaugers, which are protected against dirt accumulation by electrically conductive films between the electrodes.

The use of a device for letting off condensate out of a receptacle of a pressure gas system according to the invention will also be described.

Finally, a method for operating such a device for letting off condensate will be indicated, said method using a simplified sensor arrangement for level gauging, whereas the method makes it possible to let off, in a fully automatic way, condensate out of a receptacle provided with such a condensate trap.

Footing on the device disclosed in the document FR 1 413 218, the solution of this object is provided by means of a device that comprises a level gauger provided with a pipe element (32) whose measurements are meeting those of the outlet (26, 34) and which is prepared for a tight fastening in the outlet (26, 34), whereas the level gauger is provided with an electronic, preferably with a capacitive sensor (36) that is borne by the pipe element (32), whereas the capacitive sensor (36) has an inner electrode (38) and an outer electrode (40) that are only joined by a mechanical connection above a hollow space (54) that is airtight toward the top and that is open at the bottom, that further comprises an electronic (56, 62) connected with the sensor (36) whereas either the electronic are arranged outside the receptacle (24) or at least part of it (preamplifier 62) is arranged inside the receptacle (24) and is borne by the pipe element (32), and that comprises an external valve arrangement (30) that is connected with the electronic (56, 62).

Such a device, together with a container of a pressure gas system onto which the device is arranged, has a function similar to the one of the device for letting off condensate according to the state of the art mentioned above. As opposed to it, the device according to the invention however does not require a receptacle of its own. According to the state of the art, the receptacle of a device for letting off condensate has to be designed as a pressure reservoir, having thus to comply with certain requirements, whereas the device according to the invention, having no receptacle of its own, eludes these requirements. Additionally, the receptacle with which the device according to the invention is cooperating may be relatively big and may specifically be adjusted to the needs of the concrete pressure gas system. The device according to the invention may be adapted in the same way to the requirements of the concrete pressure gas system and more particularly of its receptacle. The device according to the invention, that is additionally arranged on a container of the pressure gas system constituting the receptacle, is considerably smaller than a condensate trap according to the state of the art, the receptacle of the condensate trap of the art having usually, of all the component parts of the condensate trap of the art, the biggest need for space.

The electronic sensor is a capacitive sensor with an inner electrode and an outer electrode. In order to avoid the formation of a closed coating between an inner electrode and an outer electrode, a mechanical connection between the inner electrode and the outer electrode is only provided above a hollow space that is airtight toward the top and open toward the bottom.

The electrodes are preferably designed so that the outer electrode is encompassing the inner electrode through 360 degrees and is closing it on the top and on the bottom in such a way that the condenser field is exclusively located, at least as far as possible, inside the outer electrode. Disturbances due to dirt accumulation and coatings are thus further reduced.

It proved to be of particular advantage to keep a minimal spacing d between the inner electrode and the outer electrode, said spacing being bigger than 2, preferably bigger than 3 and particularly bigger than 4 or 5 mm.

It also proved to be advantageous to connect an electrode of the capacitive sensor to a feed line, said feed line running at least at a height h above a lower edge of a hollow space which is airtight toward the top and open to the bottom. This also contributes to the fact that no coating that might hinder the sensor and that extends continuously from the inner electrode to the outer electrode can build up.

In a particularly advantageous development of the device according to claim 1, the capacitive sensor has an inner electrode and an outer electrode, said electrodes being connected to one another in a mechanical way only above a hollow space that is airtight toward the top and open to the bottom, whereas their electrical connection is achieved by having the feed line of the inner electrode coated with a metallic conductive element that communicates electrically with the outer electrode.

In a preferred embodiment of the invention, at least part of the electronic, particularly a pre-amplifier, is accommodated on, preferably in the pipe element,. A capacitive decoupling is thus achieved. The capacity of the feed line relative to the mass is no longer of consequence as long as the feed line is placed behind the pre-amplifier. Thus, variations in capacity due to condensate located between the electrodes may be proven with more sensitivity.

In a preferred development of the above-mentioned devices, their electronic comprises a timer.

The invention also relates to the usage of a device of the type mentioned above for letting off condensate out of a receptacle of pressure gas systems having at least one outlet, whereas the pipe element is fastened in the outlet and is placed inside the receptacle, whereas its area located outside the receptacle is tightly connected with the external valve arrangement.

In a preferred development of the usage mentioned above, the external valve arrangement is connected to a first outlet of the receptacle and the pipe element is connected with a second outlet.

Finally, the invention also relates to a method for operating a device for letting off condensate out of a receptacle of a pressure gas system, particularly of compressed-air systems, whereas the receptacle has at least one outlet. According to the method, only one unique level gauger is provided for a lower level. A timer is designed in the electronic. Once the valve arrangement is closed, the fluid level of the condensate does not even reach the lower level. If now the fluid level of the condensate is reaching the lower level, the timer is triggered. When the determined time is over, the valve arrangement is opened by the electronic. This takes place until the fluid level is again underneath the lower level. The electronic then closes the valve arrangement and the procedure starts all over again.

This procedure has the advantage that only one sensor is needed to detect a minimal level. This simplifies the electronic equipment of the condensate trap described. The installation of a second sensor, which may possibly be complicated, to detect a maximal level is no longer necessary. Such a second sensor might for example require a further access to the receptacle.

Additionally, the position of a sensor detecting the maximal level has always to be adapted to the data of the pressure gas plant, particularly individually to the maximal level of a receptacle. This is an essential disadvantage of the systems operating with only one sensor detecting a maximal level.

As opposed to this, a positioning may be chosen for a sensor detecting the minimal level, which is uniform and advantageous for lots of receptacles and which is particularly located in the vicinity of the outlet in which a condensate trap of the type describe above is mounted. Thus, the sensor may be firmly integrated in the condensate trap and an additional access to the receptacle becomes superfluous. This is a considerable advantage compared to the known condensate traps which are (only) operating with a sensor detecting a maximal level.

Another advantage is that, by detecting a minimal level and thanks to the ensuing closing of a drain valve, pressure gas or compressed air is securely prevented from escaping from the receptacle. This improves the operational safety of the condensate container described.

Further advantages and characteristics of the invention will become clear in the remaining claims as well as in the following description of embodiments that are only examples and are not limiting the scope of the invention. Said embodiments are explained in more detail with the aid of the drawing. It shows:

The numeral 20 refers to a container pertaining to a pressure gas system 22 that is not illustrated here in detail and that is only represented by a box. The container 20 constitutes a receptacle 24. Said receptacle has a first outlet 26 at its deepest point. In the embodiments cited as examples, a screwed flange 28 is welded on the outer side of the container 20 on the first outlet 26. The screwed flange is not important. The decisive fact is that a valve arrangement 30 may be firmly fastened, in some way or other, to the first outlet 26.

In the embodiments according to the FIGS. 1 to 7, a pipe element 32, that is made of metal in the embodiments mentioned, is projecting into the receptacle 24. In the embodiment according to FIG. 8, two pipe elements 32 are projecting into the receptacle 24, each pipe element having a second outlet 34 in the container 20. The pipe element 32 is part of a level gauger which will be explained in more detail in the following.

Figure 1:
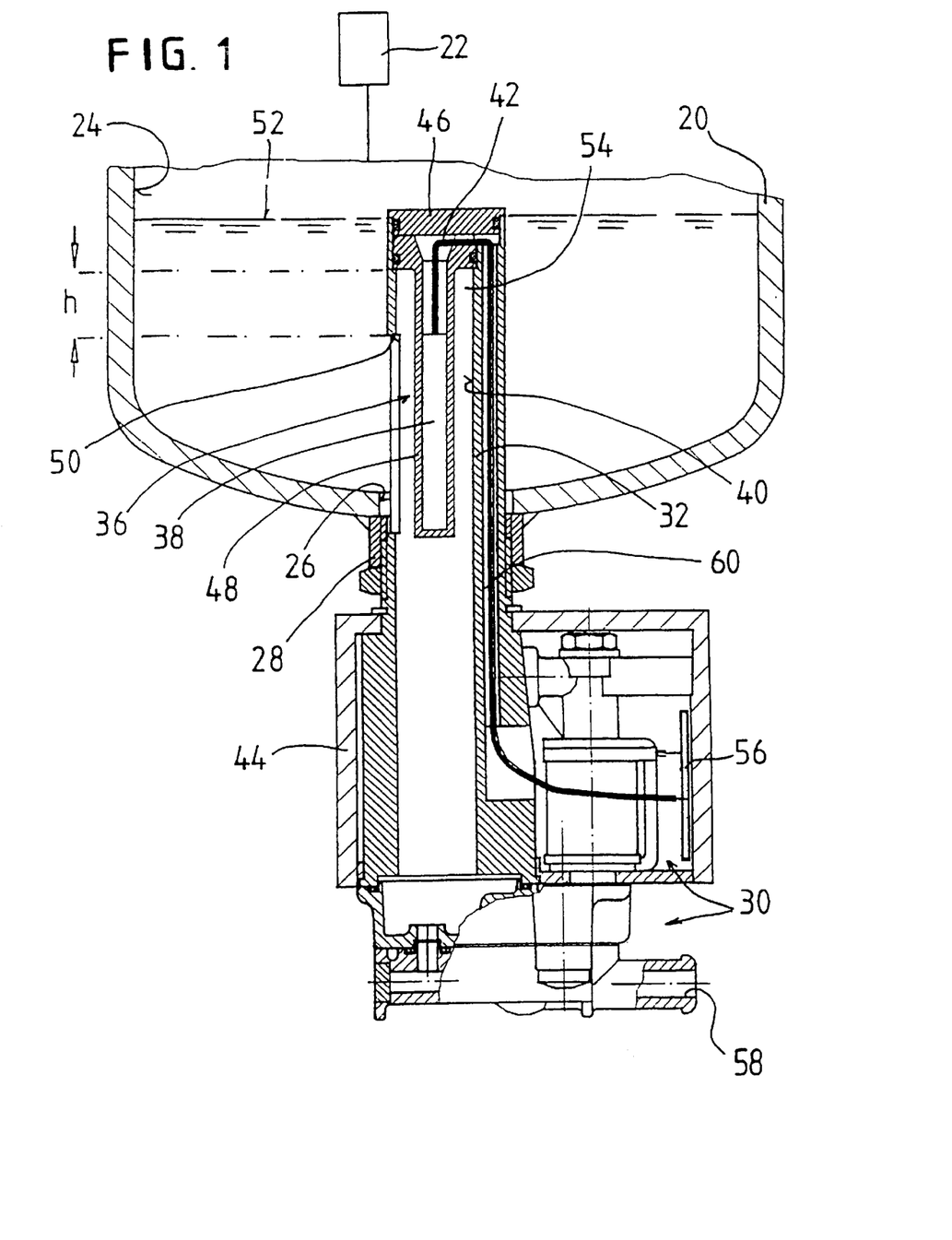
FIG. 1: a sectional view of a container of a pressure gas plant, said container constituting a receptacle, the device according to the invention being inserted and fastened in its lower part.

In the embodiment according to FIG. 1, a sensor 36 working capacitively is located in the pipe element. It has an inner electrode 38 and an outer electrode 40, whereas the outer electrode is constituted in said embodiment by a section of the pipe element 32. The arrangement of the inner electrode 38 and of the outer electrode 40 is largely cylindrically symmetric. The outer electrode 40 preferably encompasses the inner electrode 38 on an angle of 360 degrees and is extending toward the top and the bottom or is closed there, so that the inner electrode 38 is mainly sheathed. Thus, the electrical field of the condenser is nearly exclusively located inside the outer electrode 40. Outer electrodes 40 and/or inner electrodes 38 that are extending through less than 360 degrees are also possible. An electric feed line 42 is connected to the inner electrode 38. Said feed line is connected to the upper end of the actual inner electrode 38, runs from there toward the top where it runs a short distance horizontally before it passes through the pipe element 32 downwards into a casing 44 that will be described later.

The pipe element is hermetically closed at the top by a plate 46, which is preferably made of synthetic material or of another insulating material. The inner electrode is located inside an oblong pot 48, which is only open at the top, where the electric feed line 42 is running. Said pot is closed at the top by the plate 46 but for a passage for the electric feed line 42. The pot 48 is also made of an insulating material like for example synthetic material or ceramics.

A passage 50 is provided in the pipe element 32. Condensate may take this passage to pass from the receptacle 24 into the interior of the pipe element 32 and from there to the valve arrangement 30. This passage 50 ends so far underneath the upper end of the pipe element 32 that whatever the height of the level 52 of condensate, a hollow space 54 filled with air is kept in the upper area of the pot 48 and of the adjacent inner walls of the pipe element 32. No condensate can penetrate this hollow space 54 so that no dissolved or undissolved particles carried by the condensate can deposit there. A continuous film is thus prevented from spreading from the pot 48 to the inner wall of the pipe element 32. The capacitive sensor 36 is thus protected.

The hollow space 54 is also called a zone of protection. No film of deposit can build up that would continuously connect the exterior wall of the pot 48 with the inner wall of the pipe element 32, that is with the outer electrode 40.

The hollow space 54 described, which is only open to the bottom, is an important characteristic feature of the present invention. It is present in all the embodiments of the level gauger. The electric feed line 42 is always guided so that it runs far enough above the lower edge of the hollow space. The spacing kept by the electric feed line 42 inclusive an insulating sheath or case (e.g., by the edge of the pot in FIG. 1 or the pipe element 32 in FIG. 8) on its way from the inner electrode 38 and, later, from the lower edge of the hollow space, essentially determines the height h of an area located between the two electrodes 38 and 40, said area remaining free of a deposit the condensate could precipitate.

In all the examples of embodiments, the pot 48, in which the inner electrode 38 is located, is only open to the top and only fastened there. On its outer surface underneath the fastening, it is completely free.

Figures 2, 3:
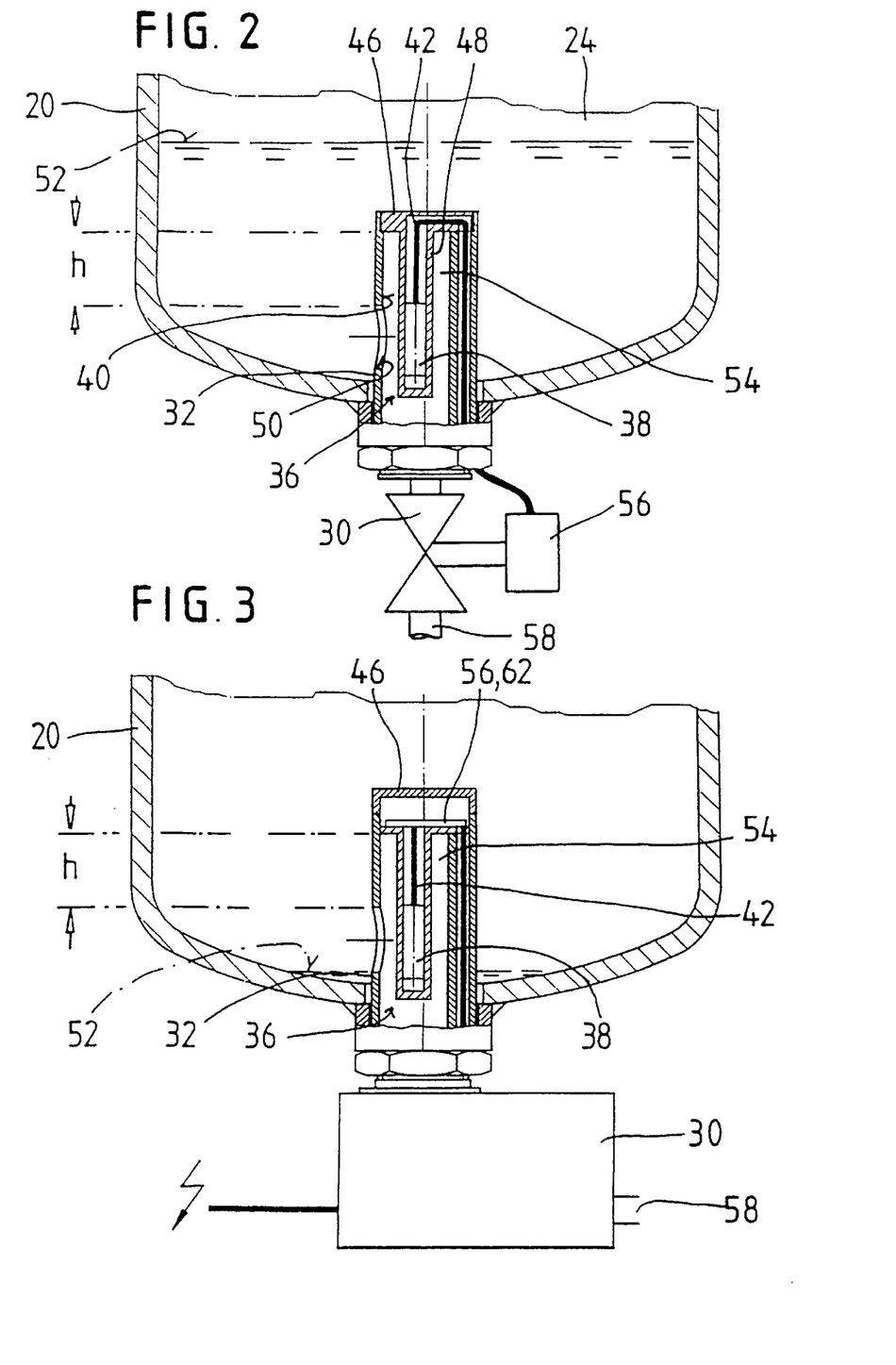
FIG. 2: a view according to FIG. 1, but in another embodiment.
FIG. 3: a view according to FIG. 1, a level gauger with a built-in electronic of its own being located in the receptacle.

In the example of an embodiment according to FIG. 1, the pipe element 32 is continuous toward the bottom, until underneath the first outlet 26 where it is connected with a known valve arrangement 30. Said valve arrangement will not be dealt with, it is sufficiently known. A valve arrangement of the type described in the EP patent specification mentioned at the beginning may be used. Directly controlled valve arrangements may also be used. In the comment of FIG. 2, this will be detailed. The valve arrangement 30 is located in the casing 44 where, according to the embodiment shown in FIG. 1, the complete electronic 56 is accommodated, said electronic being connected to the electric feed line 42. The outer electrode 40 is brought to the electronic 56 via the electric line in the metallic parts, particularly pipe element 32 and so on. The outer electrode 40 usually lies on zero or on earth potential.

58 is the outlet for the condensate. The embodiment according to FIG. 1 of the device according to the invention has sort of a very small receptacle of its own constituted by the fact that the pipe element 32 is extending downwards by approximately the same length than it is extending upwards. This receptacle is not relevant, the device according to the invention operating principally without a receptacle of its own. This is explained with the help of FIG. 2 in the following.

The embodiment according to FIG. 2 is similar to the embodiment according to FIG. 1. In the following, the differences will be considered carefully. According to FIG. 2, a special structural part is provided that constitutes the plate 46 as well as the pot 48. Just as in the embodiment according to FIG. 1, the electric feed line 42 is provided with a channel 60 of its own, said channel being sealed against the rest of the inner space of pipe element 32, that is against the area that can be penetrated by condensate.

In the embodiment according to FIG. 2, a main valve, constituting here the valve arrangement 30, is flanged directly onto the screwed flange 28. In the embodiment it is designed as a solenoid valve and is directly triggered by an electronic 56. Said electronic is communicating with the electric feed line 42 and is in contact, via the electrically conductive parts, with the outer electrode 40 that is constituted by the inner wall of the pipe element 32 on part of its length.

An important advantage of the example of an embodiment as illustrated in FIG. 3 is that part of the electronic is located in the level gauger. Said part is a pre-amplifier 62. Thanks to this pre-amplifier 62, the importance of the line capacitance, particularly the mass capacitance of the electric feed line 42, is reduced. The preamplifier 62 used may be one usually used for capacitor microphones. The electronics is accommodated above the pot 48 in a sealed room in the pipe element 32. In the present example of an embodiment, this room is located above the zone of protection, the height h of which is indicated in all the examples of embodiments.

The valve arrangement is not shown and explained in details in the embodiment according to FIG. 3. A main valve may for example be provided underneath the screwed flange 28, said main valve being designed as a diaphragm valve and triggered by an electromagnetic pilot valve. The layout corresponds to the valve arrangements 30 of the art.

Figure 4:
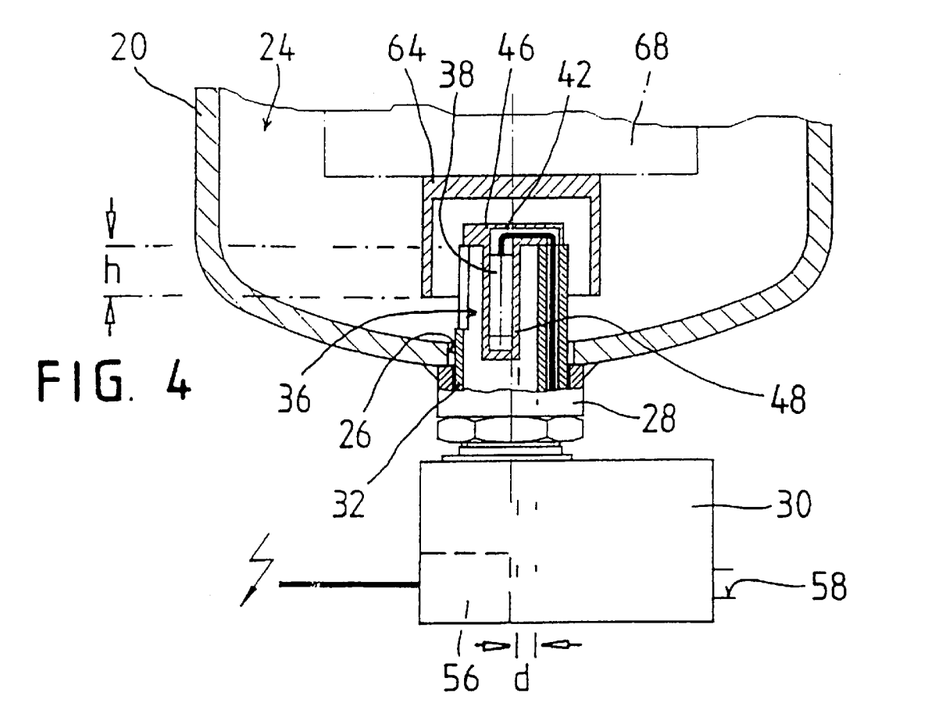
FIG. 4: a view according to FIG. 1 with a separate hollow space, which is open to the bottom.

In the embodiment according to FIG. 4, the inner hollow space, which is open to the bottom, is no longer constituted by the pipe element 32. A separate hood 64 is now taking over. As it is illustrated in FIG. 4, an annular free space of a height h exists between the lower edge of said hood and the lower border of the electric feed line's 42 sheathing. The hood is supported by an element 68 located inside the container 20, for example by a filter element. An annulus, which is only accessible from the bottom and which comprises the hollow space 54, is located between the electrodes 38, 40. The spacing between the electrodes 38, 40 is essentially the sum of the thickness of the material of which the pot 34 is made plus d. The latter is the clear distance, that is the radial size of the annulus. This size d should have at least two, preferably at least three and particularly at least four millimeters. A complete evacuation of condensate out of the annulus is thus made possible.

Figure 5:
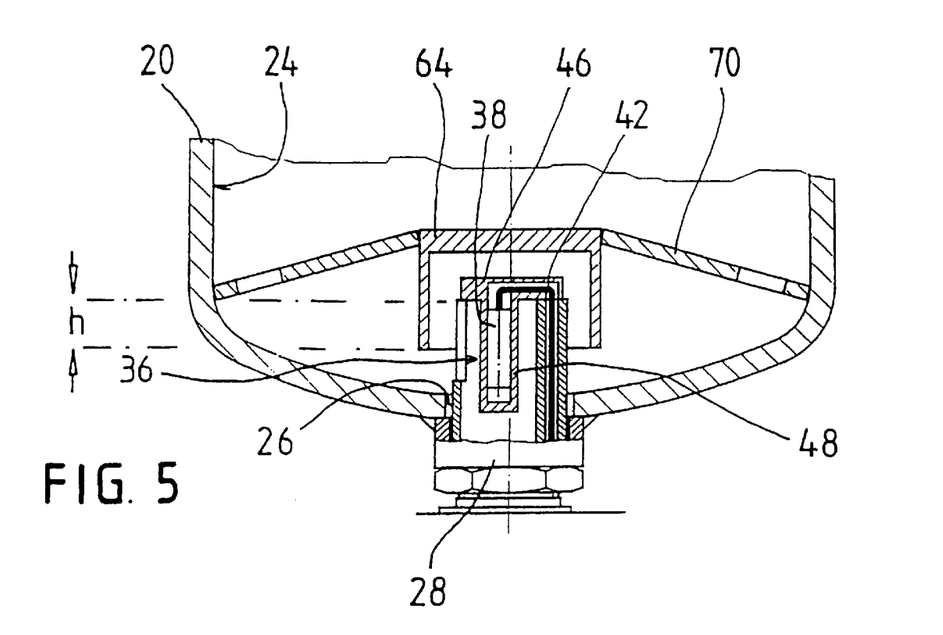
FIG. 5: a view similar to FIG. 7, whereas here, the hollow space is borne by the container of the receptacle, said hollow space being constituted by a hood.

In the embodiment according to FIG. 5, the hood 64 is positioned in exactly the same way than in the embodiment illustrated at FIG. 4. Yet now, it is borne by lateral braces 70 or props constituted by a circular ring provided with corresponding passages (as illustrated) or being given a star configuration or a similar one.

Figure 6:
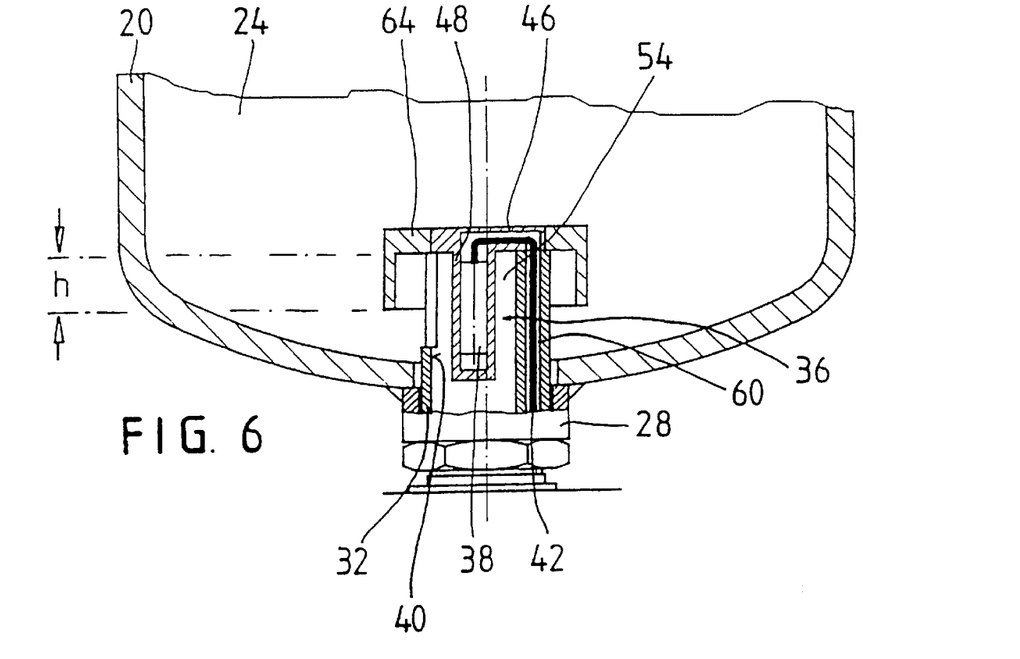
FIG. 6: a view according to FIG. 1 but without valve arrangement and intended for only one level gauger, whereas a valve arrangement may be mounted at the bottom of the level gauger.

In the embodiment according to FIG. 6, a structural part made of insulating material is again provided, said part constituting the plate 46 and the pot 48. It is encompassed tightly by a hood 46 that is forming the zone of protection of height h. The passage 50 in the pipe element 32 is extending upwards to the edge of the pot 48, so that the pipe element 32 is now not contributing to the zone of protection.

Like in the embodiment shown in FIG. 5, the valve arrangement 30 is not shown in detail. A valve arrangement according to one of the previous embodiments may be used.

Figure 7:
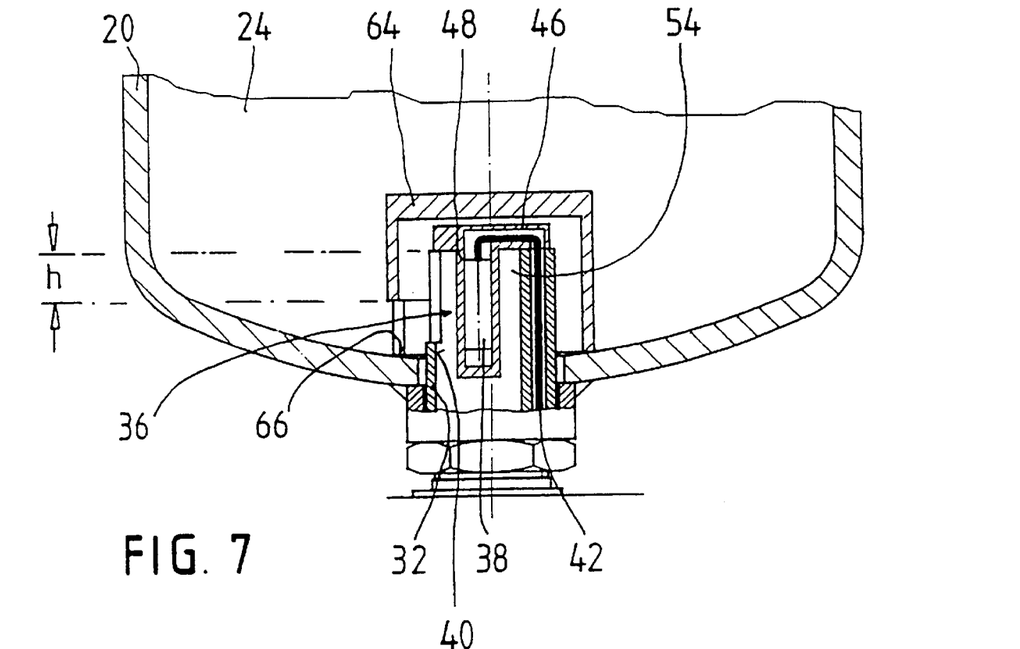
FIG. 7: a view according to FIG. 5 for another embodiment of the level gauger

The embodiment according to FIG. 7 differs from the embodiment according to FIG. 6 by the fact that the hood 64 is extending continuously to the bottom and is resting on the inner wall of the container 20 near the first outlet 26 which it is encompassing. It is fastened there. A free space may thus be constituted between the hood 64 and the structural part forming the plate 46 and the pot 48. Said free space is realized in the embodiment according to FIG. 7. In its deepest area, the hood 64 has an admission opening 66 for condensate.

Figure 8:
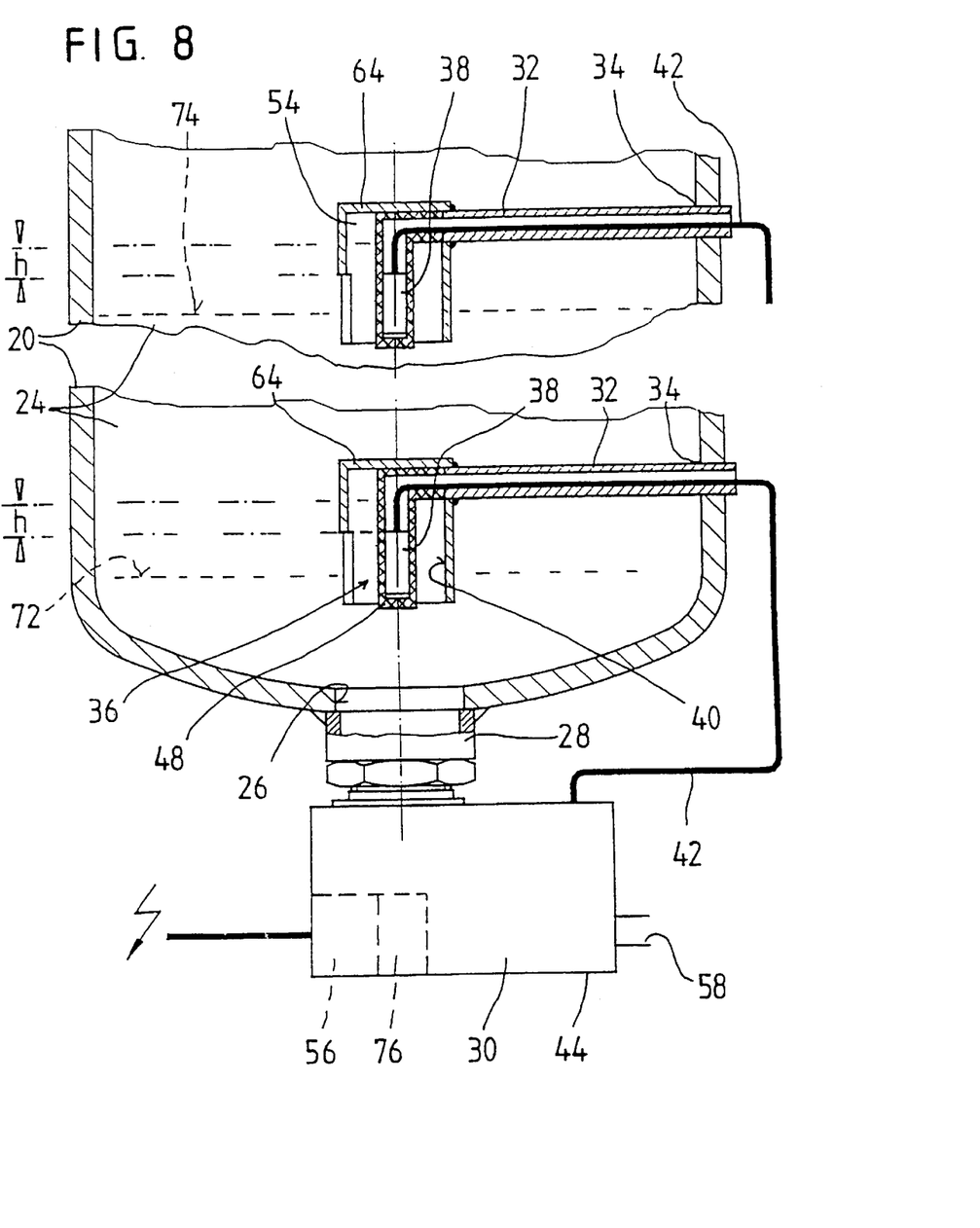
FIG. 8: a view according to FIG. 1 in an embodiment having three outlets provided in the container of the receptacle, two outlets for the level gauger and one for letting off the condensate.

In the embodiment according to FIG. 8, two pipe elements 32 are projecting, as explained above, through a second outlet 34 each. The function of the pipe element 32 is now no longer to let off condensate but exclusively to support the level gauger and to lead the electric feed line 42 out so that it remains protected. In the embodiment according to FIG. 8, the pot 48 containing the inner electrode 38 is connected to the pipe element 32 running perpendicular to it. The pipe element 32 is preferably made of metal. When the pipe element is made of an insulating material, the feed line 42 placed in the pipe element is designed as a coaxial line whose sheathing is electrically connected to the outer electrode 40. A hood 64 is again provided that is open to the bottom and is borne by the zone of protection of height h.

In FIG. 8 two identical level gaugers are arranged one on top of the other. The device according to the previous examples of embodiments only has one level gauger. This corresponds to the lower level gauger of the embodiment according to FIG. 8. In principle, all the embodiments may be equipped with one level gauger for a lower level 72, with one level gauger for an upper level 74, or with two level gaugers as illustrated at FIG. 8. If only one level gauger for the upper level 74 is provided, it may be identical with the level gaugers of the examples of embodiments. In case of two level gaugers, they may be arranged axially one on top of the other or laterally offset. When arranged axially on top of one another, they may be accommodated in the same pipe element. Advantageously, two different inner electrodes 38 are arranged at some distance from each other on top of one another in a relatively long pot 48. It is also possible to use two completely separate arrangements, each of them having a hollow space 54 of its own.

The valve arrangement 30 is placed on the first outlet 26, which is provided with a screwed flange 28. Its construction is similar to the one of the embodiment according to FIG. 3, but this does not entail any limitation. In principle and like in all the other examples of embodiments, any valve arrangement 30 may be provided on the first outlet 26.

With respect to the procedure, the devices are operating with only one level gauger intended to indicate a lower level 72 of the liquid level 52 in the following way: once the last draining procedure has been completed, that is once the valve arrangement 30 has been opened and closed again, the liquid level 52 is under the lower level 72. If now the liquid level is rising and reaching the lower level 72, a time keeper or a timer 76 is triggered. While the time keeper is running, condensate is accumulating and the liquid level 52 is rising, starting from the lower level 52. Once the time keeper has run down, the valve arrangement 30 is opened again. It remains open until the liquid level has sunk under the lower level 72. Then it starts all over again.

In case of an additional level gauger for the upper level 74, a letting-off procedure starts to take place, that is the valve arrangement 30 is opening when the upper level 74 is reached and it ends when the lower level 72 is reached. In this case, a time keeper is not necessary. The valve arrangement 30 is only opened again after a letting-off procedure when the upper level 74 is reached once more.

In case of only one level gauger for the upper level 74, a letting-off procedure, that is an opening of the valve arrangement 30 starts when the upper level 74 is reached. The valve arrangement 30 is kept back for a predetermined period of time. That means that a time keeper 76 is actuated. Once said time keeper has run down, the valve arrangement 30 is closed again. Condensate may accumulate again until the upper level 74 is reached and a new letting-off procedure is starting. In the preferred embodiment, the device according to the invention has only one level gauger for the lower level, as may be seen in the FIGS. 1 to 7.

What is claimed is:

1. An apparatus for removing condensate from a gas pressure system, comprising:
   a receptacle for accumulating condensate during operation of the pressure gas system, the receptacle having an outlet characterized by a size; and
   a device for removing condensate from said receptacle, said device comprising a gauge and a tubular body having a top and a bottom and having a size corresponding to the size of the outlet, the tubular body capable of being fastened tightly within the outlet and being disposed within said receptacle when mounted, said device further comprising a capacitive sensor supported by the tubular body and connected to a circuit which is capable of actuating an external valve;
   wherein the capacitive sensor has an inner electrode and an outer electrode, the electrodes being connected above a hollow space which is airtight with respect to the top of the tubular body and which is open with respect to the bottom of the tubular body.

2. The apparatus according to claim 1, wherein condensate does not accumulate in the device.

3. The apparatus according to claim 1, wherein one of the electrodes of the capacitive sensor is connected to a feed line, and wherein the feed line runs at least at a height h above a lower edge of the hollow space.

4. The apparatus according to claim 3, wherein the electrode connected to the feed line projects out of the hollow space.

5. The apparatus according to claim 1 or 3, wherein the electrodes of the capacitive sensor are spaced from each other by at least 2 mm in the hollow space, the spacing of the electrodes being measured parallel to a liquid level of the condensate.

6. The apparatus according to claim 1, wherein electrodes of the capacitive sensor are connected to at least a portion of the circuit which is fastened inside the receptacle and on the tubular body, and wherein an electric feed line runs through the tubular body and is connected to the circuit.

7. The apparatus according to claim 1, wherein the circuit is disposed outside said receptacle, and wherein at least one electrode of the capacitive sensor is connected to the circuit by an electric feed line which runs through the tubular body.

8. The apparatus according to claim 1, wherein the tubular body is connected to a valve disposed outside said receptacle.

9. The apparatus according to claim 1, wherein said receptacle has a first outlet and a second outlet, the valve being connected to the first outlet and the tubular body being disposed on the second outlet.

10. The apparatus according to claim 1, wherein the circuit includes a timer.

11. The apparatus according to claim 1, wherein said device includes a single level gauge for a lower level.

12. A method of operating an apparatus for removing condensate from a gas pressure system, said method comprising the steps of:

providing a receptacle for accumulating condensate during operation of the pressure gas system, the receptacle having an outlet characterized by a size; and providing a device for removing condensate from the receptacle, said device comprising a single level gauge in the form of a capacitive sensor and a tubular body having a top, a bottom, and a size corresponding to the size of the outlet, the tubular body capable of being fastened tightly within the outlet and being disposed within said receptacle when mounted, wherein the capacitive sensor is supported by the tubular body and connected to a circuit which is capable of actuating an external valve;

wherein the capacitive sensor has an inner electrode and an outer electrode, the electrodes being connected above a hollow space which is airtight with respect to the top of the tubular body and which is open with respect to the bottom of the tubular body; and wherein the single level gauge is attributed to a lower level and the circuit includes a timer, and wherein when the external valve is closed and a liquid level of the condensate reaches the lower level, the timer is triggered, and when the timer has run, the external valve is kept open by the circuit until the liquid level has fallen below the lower level and the circuit closes the external valve.

13. An apparatus for removing condensate from a gas pressure system, comprising:

a receptacle for accumulating condensate during operation of the pressure gas system, the receptacle having an outlet characterized by a size;

a device for removing condensate from said receptacle, said device comprising a level gauge having a capacitive sensor and a tubular body, wherein said tubular body has a top and a bottom, and a size corresponding to the size of the outlet, said tubular body capable of being fastened tightly within the outlet and being disposed within said receptacle when mounted, said capacitive sensor supported by the tubular body and connected to a circuit which is capable of actuating an external valve;

wherein the capacitive sensor has an inner electrode and an outer electrode, the electrodes being connected above a hollow space which is airtight with respect to the top of the tubular body and which is open with respect to the bottom of the tubular body.

14. The apparatus according to claim 13, wherein condensate does not accumulate in the device.

15. The apparatus according to claim 13, wherein one of the electrodes of the capacitive sensor is connected to said circuit by an electric feed line, and wherein the electric feed line runs at least at a height h above a lower edge of the hollow space.

16. The apparatus according to claim 15, wherein the electrode connected to the electric feed line projects out of the hollow space.

17. The apparatus according to claim 15, wherein the electrodes of the capacitive sensor are spaced from each other by at least 2 mm in the hollow space, the spacing of the electrodes being measured parallel to a liquid level of the condensate.

18. The apparatus according to claim 13, wherein the electrodes of the capacitive sensor are connected to at least a portion of the circuit which is fastened inside the receptacle and on the tubular body, and wherein an electric feed line runs through the tubular body and is connected to the circuit.

19. The apparatus according to claim 13, wherein the circuit is disposed outside said receptacle, and wherein at least one electrode of the capacitive sensor is connected to the circuit by an electric feed line which runs through the tubular body.

20. The apparatus according to claim 13, wherein the tubular body is connected to the external and wherein the external valve is disposed outside said receptacle.

21. The apparatus according to claim 13, wherein said receptacle has a first outlet and a second outlet, the external valve being connected to the first outlet and the tubular body being disposed on the second outlet.

22. The apparatus according to claim 13, wherein the electrodes of the capacitive sensor are spaced from each other by at least 2 mm in the hollow space, the spacing of the electrodes being measured parallel to a liquid level of the condensate.

23. The apparatus according to claim 13, wherein the circuit includes a timer.

24. The apparatus according to claim 13, wherein said device includes a single level gauge for a lower level.

* * * * *